United States Patent [19]

Rumsey et al.

[11] Patent Number: 5,467,229
[45] Date of Patent: Nov. 14, 1995

[54] ADJUSTABLE LASER DIODE LENS ASSEMBLY

[75] Inventors: Karen M. Rumsey, Redondo Beach; Patrick Y. Maeda, Palo Alto; Vincent W. AuYeung, Temple City, all of Calif.

[73] Assignee: Xerox Corporation, Stamford, Conn.

[21] Appl. No.: 358,507

[22] Filed: Dec. 19, 1994

[51] Int. Cl.$^6$ ........................................... G02B 7/02
[52] U.S. Cl. ........................ 359/822; 359/819; 359/818
[58] Field of Search ................................. 359/822, 823, 359/819, 820, 825, 826, 829, 830, 818

[56] References Cited

U.S. PATENT DOCUMENTS

| | | | |
|---|---|---|---|
| 3,752,569 | 8/1973 | Nelson et al. | 359/819 |
| 3,871,752 | 3/1975 | Habinger | 359/818 |
| 3,941,460 | 3/1976 | Meginnis | 359/819 |
| 4,436,375 | 3/1984 | Meginnis | 359/819 |
| 4,468,095 | 8/1984 | Meginnis | 359/819 |
| 4,614,403 | 9/1986 | Kersten et al. | 359/818 |
| 5,313,333 | 5/1994 | O'Brien et al. | 359/819 |

*Primary Examiner*—Loha Ben
*Attorney, Agent, or Firm*—Fariba Rad

[57] ABSTRACT

There is disclosed an adjustable collimator assembly which utilizes a lens barrel member and a housing member which holds a laser diode at a fixed position. A portion of one of these members are received within a portion of the other member. These two members have a coacting member to provide a relative movement between them for adjusting the lens barrel member relative to the laser diode. The potion of the other member which receives the one member has an integral gripping means for gripping the one member to fix the position of the members relative to each other in order to fix the position of the lens barrel relative to the laser diode.

15 Claims, 5 Drawing Sheets

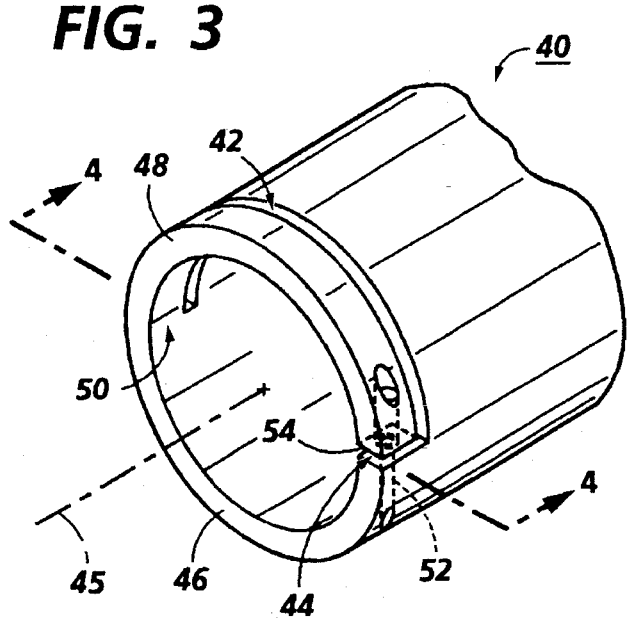
FIG. 3
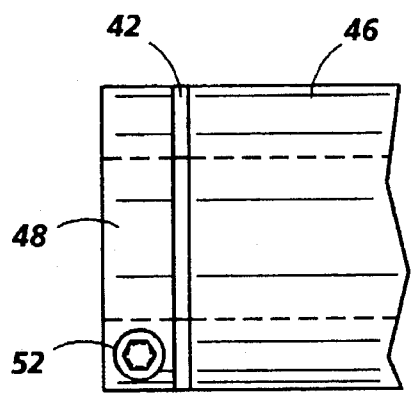

ADJUSTABLE LASER DIODE LENS ASSEMBLY

BACKGROUND OF THE INVENTION

This invention relates to an adjustable laser diode lens assembly, and more particularly, to a high precision adjustable collimator assembly used for a large numerical aperture collimating lens or a series of large numerical aperture collimating lenses.

A conventional raster scanner system utilizes a light source, a collimator, a multi-faceted rotating polygon mirror as the scanning element and a photosensitive medium. The light source, which is typically a laser source, emits a light beam and sends it to the collimator. The collimator collimates the light beam and sends it to the rotating polygon mirror. In an overfilled scanning system, the light beam which is wide enough to cover two facets will be directed onto two facets of the rotating polygon mirror. The rotating polygon mirror reflects the light beam and also causes the reflected light to revolve about an axis near the center of rotation of the rotating polygon and scan a line. This reflected light beam can be utilized to impinge upon a photographic film or a photosensitive medium, such as a xerographic drum at the output of the imaging system.

An overfilled raster output scanner enables a high resolution, fast printing rate and wide scan range. However, it requires the light beam to be wide enough to cover two facets of a rotating polygon mirror. Typically, high resolution raster scanning systems require a large rotating polygon mirror with large facets. Therefore, the light beam required to fill two facets of a large rotating polygon mirror has to be adequately wide such as 1 inch.

In order to collimate and widen a light beam from a laser diode to a light beam with a width such as 1 inch or more, a large numerical aperture lens or a series of large numerical aperture lenses are required. Large numerical aperture lenses have large diameters such as 1 inch. Therefore, a housing is required to hold the laser diode and a lens barrel containing one collimating lens or a series of collimating lenses. Since the the assembly of the housing and the lens barrel is quite large, a mechanism is required to move the lens barrel in the housing at a high precision with respect to the diode which is at a fixed position and then fix the lens barrel in the housing at a desired position.

It is an object of this invention to provide an adjustable collimator assembly.

SUMMARY

In accordance with the present invention, there is disclosed an adjustable collimator assembly which utilizes a lens barrel member and a housing member which holds a laser diode at a fixed position. A portion of one of these members are received within a portion of the other member. There is also a coacting means on these members to provide a relative movement between the two members for adjustment of the lens barrel member relative to the laser diode. The portion of the other member has a gripping means for gripping the one member to fix the position of the members relative to each other.

BRIEF DESCRIPTION OF THE DRAWINGS

FIG. 3 shows a isometric view of a split collar utilized in the lens barrel adjustment cap of FIG. 2;

FIG. 4 shows a cross sectional view along line 4—4 of FIG. 3;

FIG. 5 shows a magnified portion of FIG. 4 showing a hole in the gripping member which extends into the free end of the gripping member, across an axial slit and into a cylindrical wall;

FIG. 6 shows a top view of a split collar 40 of FIG. 3;

DESCRIPTION OF THE PREFERRED EMBODIMENT

Figure 1:
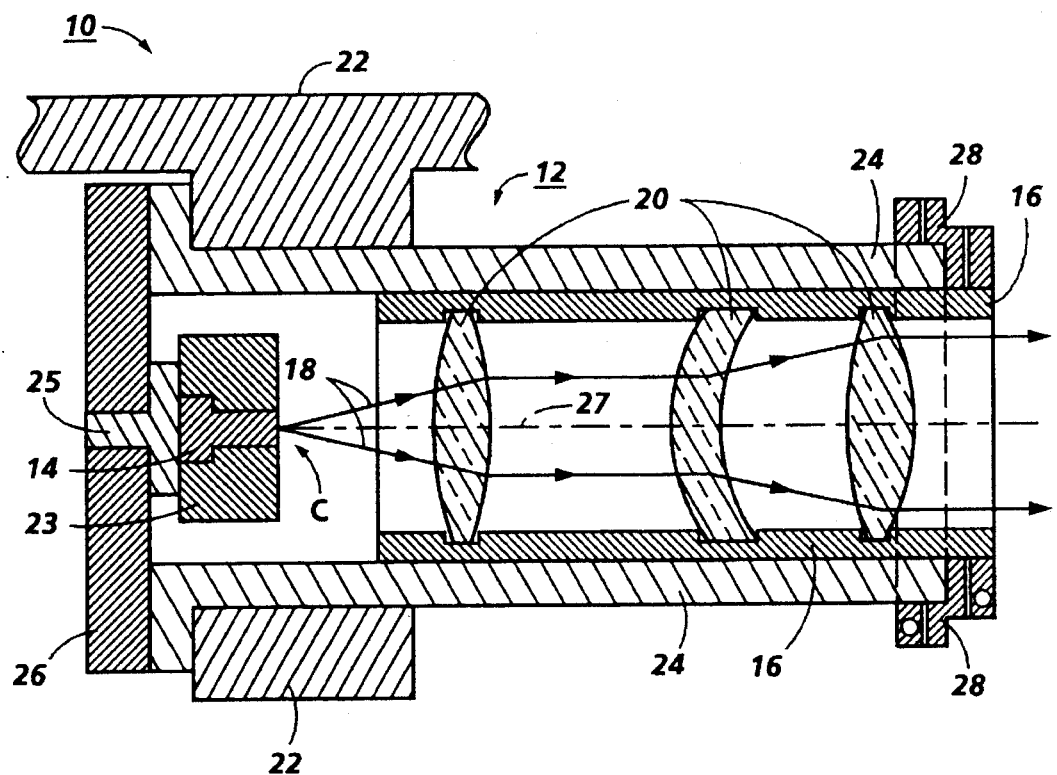
FIG. 1 shows a cross sectional view of an adjustable collimator assembly of this invention.

Referring to FIG. 1, there is shown a cross sectional view of an adjustable collimator assembly 10 of this invention. In this assembly a housing 12 holds a laser diode 14 and a lens barrel 16 in a fixed position relative to each other in such a manner that the light beam 18 from the laser diode will be sent into the lens barrel 16. The lens barrel 16, which has a uniform diameter throughout its length, holds a set of collimating lenses 20 to collimate the light beam 18. The housing 12, which is mounted on a frame 22 of a printing system, is a hollow cylinder which has a cylindrical wall 24. The laser diode 14 which is in a diode holder 23 is mounted on a thermoelectric cooler 25. The thermoelectric cooler 25 is mounted on a heat sink 26 and the heat sink 26 is mounted onto the housing 12 in such a manner that the laser diode 14 is placed inside the housing 12 at a fixed position.

To produce a collimated light beam, the lens barrel 16 and the laser diode 14 have to be kept at a precise position relative to each other and the optical axis 27 of the lens barrel 16 which is coincident with the axis of the housing has to pass through the center C of the laser diode 12. Since the laser diode 14 is fixed inside the housing, the lens barrel 16 has to be moved within the housing in order to find the precise position.

In this invention, in order to provide a high precision adjustment between the lens barrel 16 and the laser diode 14, a lens barrel adjustment cap 28 is utilized.

Figure 2:
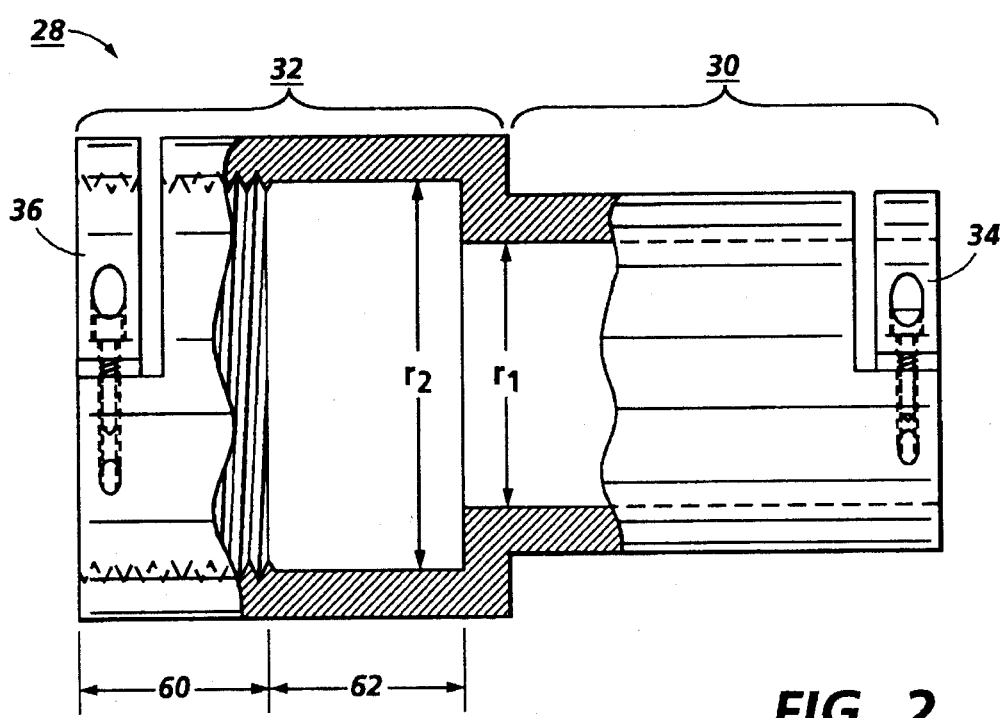
FIG. 2 shows a side view of a lens barrel adjustment cap of utilized in FIG. 1.

Referring to FIG. 2 there is shown a side view of a lens barrel adjustment cap 28 of this invention. The lens barrel adjustment cap 28 has two hollow cylindrical sections 30 and 32. The radius $r_1$ of section 30 is smaller than the radius $r_2$ of section 32. Section 30 is designed to receive the lens barrel 16 and section 32 is designed to receive the housing 12. Each one of the cylindrical sections 30 and 32 has an integral gripping member called a "split collar". The split collar 34 of cylindrical section 30 is responsible for gripping the lens barrel 16 and the split collar 36 of cylindrical section 32 is responsible for gripping the housing 12.

Referring to FIGS. 3, there is shown an isometric view of a split collar 40 which is incorporated in the cylindrical sections 30 and 32 of FIG. 2 as the split collars 34 and 36. Referring to FIG. 4, there is shown a cross sectional view along line 4—4 of FIG. 3. Referring to FIG. 5, there is shown a magnified portion of FIG. 4 showing a hole in the gripping member which extends into the free end of the gripping member, across an axial slit and into a cylindrical wall. Referring to FIG. 6, there is shown a top view of a split collar 40 of FIG. 3.

Referring to FIGS. 3, 4, 5 and 6, split collar 40 is located on a cylindrical wall 46 which has an axis 45. A circumferential slit 42 and an axial slit 44 (along the direction of axis 45) through the cylindrical wall 46 provide a gripping member 48 which is free along the circumferential and the axial slits 42 and 44 respectively and is attached to the cylindrical wall at one end 50. The gripping member 48 has a hole 52 along a straight line. The hole 52 extends into the free end 54 of the gripping member 48, across the axial slit 44 and into the cylindrical wall 46.

The hole is threaded to receive a screw. By twisting a screw in the hole 52, the gripping member 48 can be pulled toward the the cylinder and into the axial slit 44 to grip the housing 12 in order to keep the lens barrel 16 and the housing 12 at a fixed position relative to each other.

Referring back to FIG. 2, the inner surface of cylindrical section 30 including the surface under the split collar 34 is polished. However, a portion 60 of the inner surface of cylindrical section 32 is threaded. The threaded portion 60 extends under the split collar 36. The non-threaded portion 62 of the inner surface of cylindrical section 32 is polished.

Figure 7:
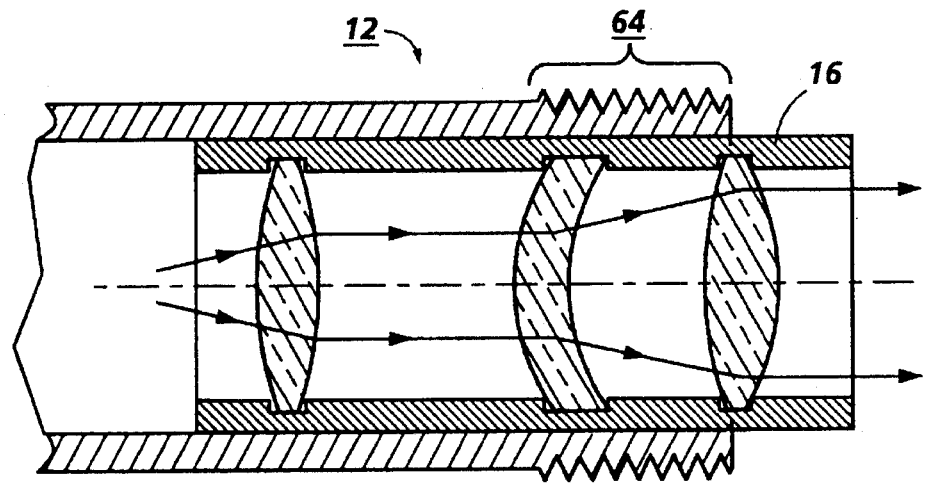
FIG. 7 shows a segment of the housing of FIG. 1 which has a threaded portion on its outer surface.

Referring to FIG. 7, there is shown a segment of the housing 12 of FIG. 1 holding the lens barrel 16. As it can be observed, a portion 64 of the housing 12 has mating threads on its outer surface to engage the threaded portion 60 of cylindrical section 32 to provide a relative movement between the housing 12 and the lens barrel 16 in order to adjust the lens barrel 16 relative to the laser diode 12. The threads on the housing 12 and the threads inside the cylindrical section 32 are fine threads. In all the disclosed embodiments of this invention, the threads are 0.5 mm (500 micron) threads which cause a 500 micron movement by each revolution.

Referring to FIGS. 1, 2 and 7, during the assembly of the adjustable collimator assembly 10, the lens barrel 16 will be slid into the cylindrical section 30 and the split collar 34 will be tightened to grip the lens barrel 16. Then the lens barrel will be slid into the housing 12 until the threaded portion 64 of the housing 12 engages the threaded portion 60 of the cylindrical section 32. Then the lens barrel adjustment cap will be twisted in order to move the two engaged threaded portions 60 an 64 causing the lens barrel 16 to move within the housing 12. In the enclosed embodiment of FIG. 1, since the threads are 0.5 mm threads, one can twist the lens barrel adjustment cap 28 slightly to move the lens barrel by a fraction of 500 micron. Once the precise location of the lens barrel 16 relative to the laser diode 14 is found (where the light beam becomes collimated), the split collar 36 will be tightened to grip the housing 12. By gripping the housing 12, the lens barrel 16 will be fixed at the same position.

The lens barrel adjustment cap 28 is useful for conventional lens barrels which do not have any threaded portion on the lens barrel. However, if a lens barrel is designed to have a threaded portion, then the lens barrel adjustment cap can be eliminated and the housing can be designed to have an adjustment mechanism.

Figure 8:
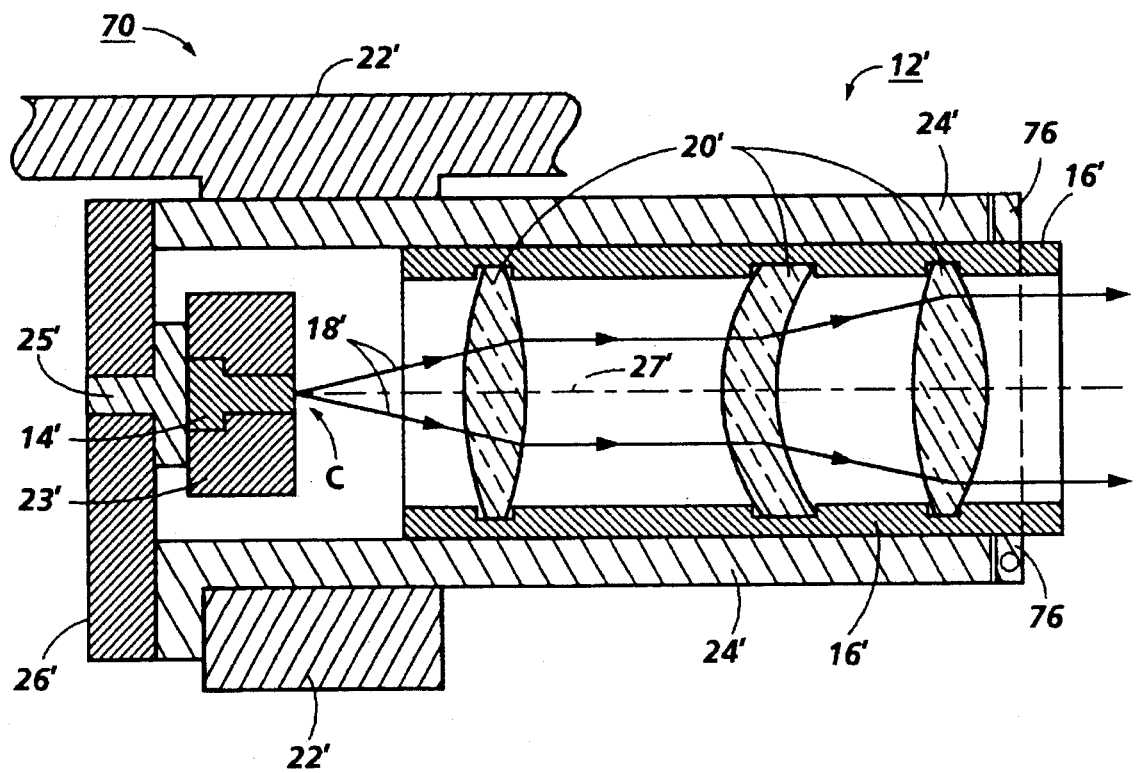
FIG. 8 shows a preferred embodiment of an adjustable collimator assembly of this invention.
Figure 9:
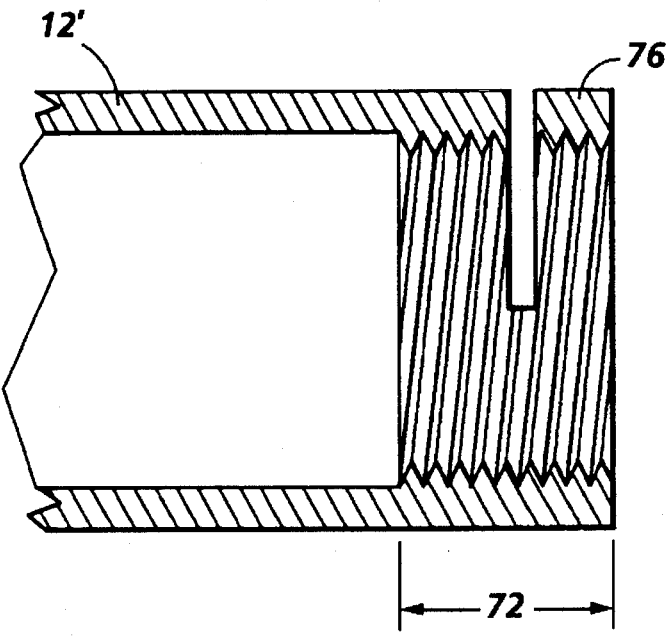
FIG. 9 shows a segment of the housing of FIG. 8 which has a threaded portion on its inner surface.
Figure 10:
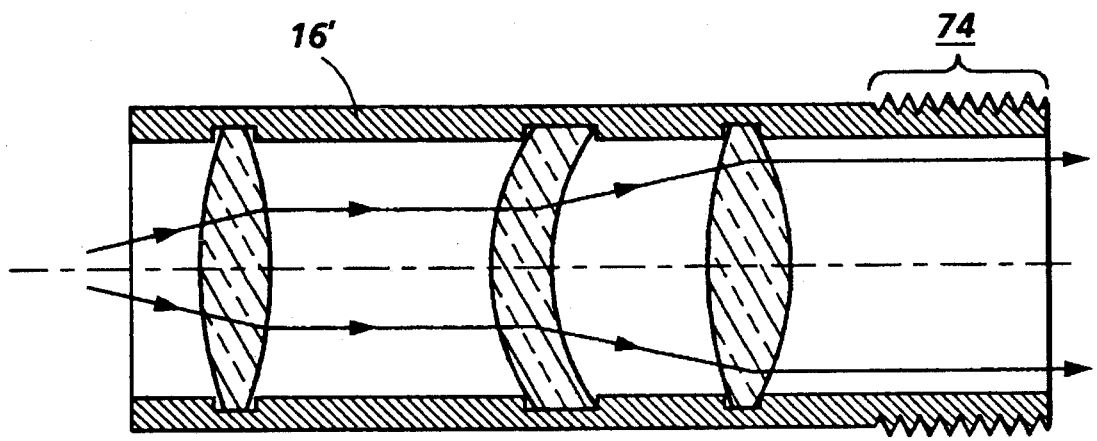
FIG. 10 shows a lens barrel which has a threaded portion on its outer surface to engage the threaded portion of the inner surface of the housing of FIGS. 8 and 9.

Referring to FIG. 8, there is shown a preferred embodiment of an adjustable collimator assembly 70 of this invention. In FIG. 8, those elements which are the same as disclosed in the description of FIG. 1 are designated by the same reference numerals, only with a prime "'" affixed thereto. In this assembly 70, the lens barrel adjustment cap 28 of FIG. 1 is eliminated since the adjustment mechanism is incorporated into the design of the lens barrel 16' and the housing 12'. Referring to FIG. 9, there is shown a cross section of a segment of the housing 12' of FIG. 8 and referring to FIG. 10, there is shown the lens barrel 16' designed to be received by the housing 12' of FIG. 8. As it can be observed, the housing 12' has a threaded portion 72 on its inner surface and the lens barrel 16' has mating threads on a portion 74 of its outer surface as shown in FIG. 10. In addition, housing 12' also has a split collar 76 over the threaded portion 72 for gripping purposes.

During the assembly of adjustable collimator assembly 70, the lens barrel will be slid into the housing 12' and then the threaded portion 74 of the lens barrel 16' will engage the threaded portion 72 of the housing 12'. At this time, the lens barrel 16' will be twisted in order to move the lens barrel 16' in the housing 12'. Since the threads are very fine (500 micron), one revolution will cause a 500 micron movement. The lens barrel 16' will be moved in order to find the precise position of the lens barrel 16' relative to the laser diode 12' at which point the light beam exiting the lens barrel 16' will be collimated. At this position, the lens barrel 16' will be kept in the same position while the split collar 76 on the housing 12' will be tightened. Once the split collar 76 is tightened, the lens barrel 16' will be fixed relative to the laser diode 12'.

Figure 11:
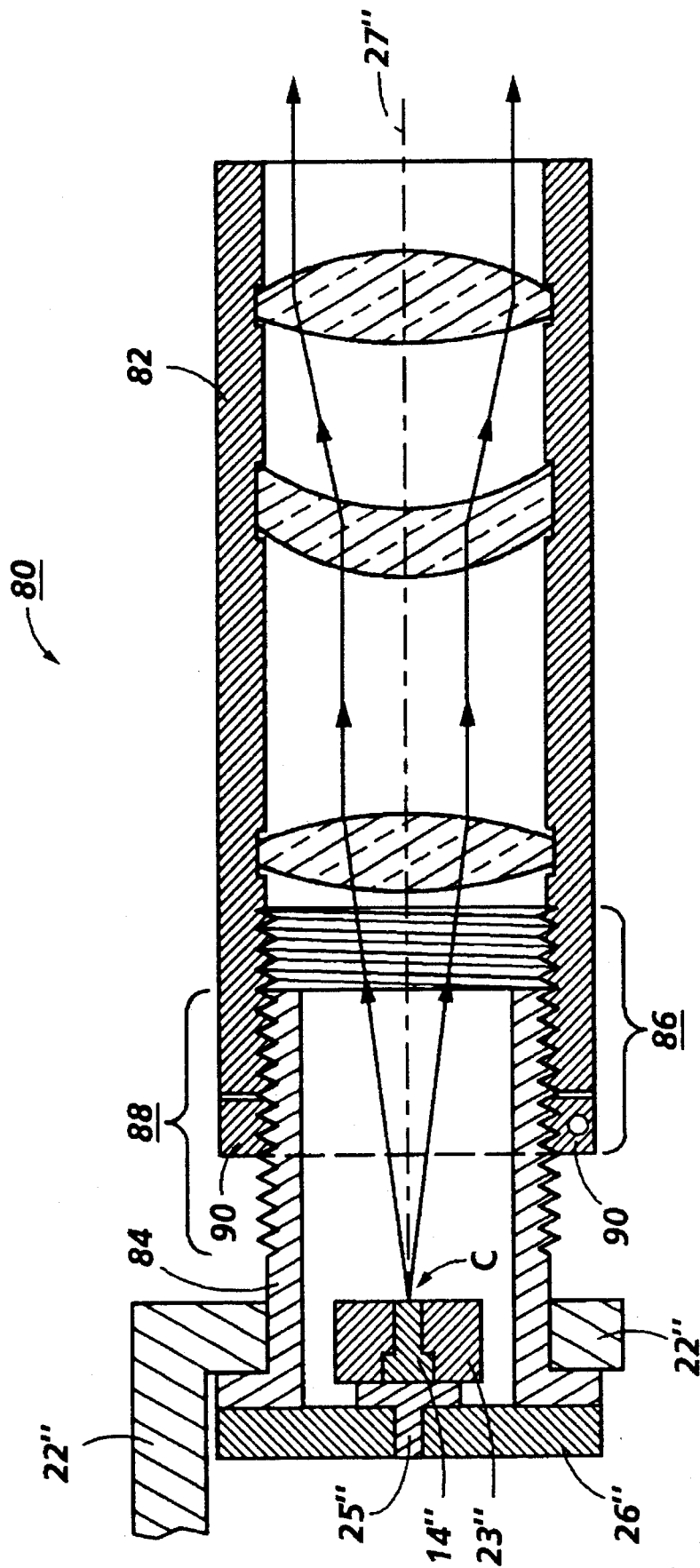
FIG. 11 shows an alternative adjustable collimator assembly of this invention.

Referring to FIG. 11, there is shown another alternative to the adjustable collimator assembly 80 of this invention. In FIG. 11, those elements which are the same as disclosed in the description of FIG. 1 are designated by the same reference numerals, only with a double prime "''" affixed thereto. In FIG. 11, the lens barrel 82 is designed to receive the housing 84. The lens barrel 82 is designed to have an extension 86. The extension 86 which has an inner circumference to receive the housing 84 is threaded on its inner surface. The housing 84 has a potion 88 of mating threads to engage the threads of the lens barrel 82. The lens barrel 82 also has a split collar 90 in order to grip the housing 84.

During the assembly of adjustable collimator assembly 80, the lens barrel 82 will be slid onto the housing 84 in order to engage the threaded portion 88 of the housing 84 to the threaded portion 86 of the lens barrel 82. At this time, the lens barrel 82 will be twisted in order to move the lens barrel 82 outside of the housing 84. Since the threads are very fine (500 micron), one revolution will cause a 500 micron movement. The lens barrel 82 will be moved in order to find the precise position of the lens barrel 82 relative to the laser diode 12" at which point the light beam exiting the lens barrel 82 will be collimated. At this position, the lens barrel 82 will be kept in the same position while the split collar 90 on the lens barrel 82 will be tightened. Once the split collar 90 is tightened, the lens barrel 82 will be fixed relative to the laser diode 12".

The adjustable collimator assemblies disclosed in this invention have the advantage of providing a realignment possibility. In each of the adjustable collimator assemblies of this invention, if the laser diode needs to be changed, the lens barrel can be adjusted for a replaced laser diode or if due to the movement of the printing system or any other reason, the laser diode and the lens barrel lose their alignment, they can be realigned.

What is claimed is:

1. An adjustable lens assembly comprising:

a housing member;

a laser diode mounted within said housing member at a fixed position;

a lens barrel member for said laser diode;

a portion of one of said members being received within a portion of the other said member;

coacting means on said members for providing a relative movement between said members for adjustment of said lens barrel member relative to said laser diode;

said portion of said other member having a gripping means for gripping said one member to fix the position of said members relative to each other;

said portion of said other member comprising a hollow cylinder having a cylindrical wall and an axis;

said cylinder having two axially spaced ends;

said cylinder having a circumferential slit extending through said cylindrical wall;

said circumferential slit having circumferentially spaced apart ends;

an axial slit extending generally in a direction of the axis of said cylinder and through the wall of said cylinder from one of said cylinder ends to one of said ends of said circumferential slit;

said circumferential slit and said axial slit defining said gripping means which is detached from a main portion of said cylinder along said slits and integral with the main portion of said cylinder at the other of said ends of said circumferential slit whereby said gripping means is free to move relative to the main portion of said cylinder to grip said one member; and means extending through said gripping means, across said axial slit and into said wall of the main portion of said cylinder for moving said gripping means toward the main portion of said cylinder for gripping said one member.

2. The adjustable assembly recited in claim 1, wherein said one member is said lens barrel member and said other member is said housing member.

3. The adjustable assembly recited in claim 1, wherein said one member is said housing member and said other member is said lens barrel member.

4. The adjustable assembly recited in claim 3, wherein said lens barrel member is of a generally uniform dimension throughout its length.

5. The adjustable assembly recited in claim 3, wherein said lens barrel member has axially spaced ends and said gripping means is at one end of the lens barrel member.

6. The adjustable assembly recited in claim 5, wherein said lens barrel member is of a generally uniform dimension throughout its length.

7. The adjustable assembly recited in claim 3, wherein said lens barrel member has axially spaced ends and said gripping means is located between said lens barrel member ends.

8. The adjustable assembly recited in claim 1, wherein said one member has a further portion extending outside and surrounding said other member, said one member is said housing member and said other member is said lens barrel member.

9. The adjustable assembly recited in claim 1, wherein said coacting means has threads on said portion of said one member and mating threads on said portion of said other member including said gripping means of said other member for mating with the threads of said one member.

10. The adjustable assembly recited in claim 9, wherein said one member is said lens barrel member and said other member is said housing member.

11. The adjustable assembly recited in claim 9, wherein said one member is said housing member and said other member is said lens barrel member.

12. The adjustable assembly recited in claim 11, wherein said lens barrel member is of a generally uniform dimension throughout its length.

13. The adjustable assembly recited in claim 11, wherein said lens barrel member has axially spaced ends and said gripping means is at one end of the lens barrel member.

14. The adjustable assembly recited in claim 13, wherein said lens barrel member is of a generally uniform dimension throughout its length.

15. The adjustable assembly recited in claim 11, wherein said lens barrel member has axially spaced ends and said gripping means is located between said lens barrel member ends.

* * * * *